United States Patent [19]

Hoffmann et al.

[11] 4,418,307

[45] Nov. 29, 1983

[54] METHOD AND APPARATUS FOR CONTROLLING THE ROTATIONAL SPEED AND PHASE OF SYNCHRONOUS MOTORS

[75] Inventors: Harald Hoffmann, Kiel; Dan-Corneliz Raducanu, Eberbach, both of Fed. Rep. of Germany

[73] Assignee: Braun Aktiengesellschaft, Kronberg, Fed. Rep. of Germany

[21] Appl. No.: 187,855

[22] Filed: Sep. 16, 1980

[30] Foreign Application Priority Data

Sep. 19, 1979 [DE] Fed. Rep. of Germany ....... 2937838

[51] Int. Cl.[3] ................................................ H02P 5/40

[52] U.S. Cl. .................................... 318/721; 318/314; 318/702

[58] Field of Search ................ 318/702, 703, 721-723, 318/314, 318

[56] References Cited

U.S. PATENT DOCUMENTS

| | | | |
|---|---|---|---|
| 3,495,208 | 2/1970 | Grada | 318/314 |
| 3,532,994 | 10/1970 | Ferrier | 318/314 |
| 3,794,894 | 2/1974 | Vanleer | 318/702 |
| 3,829,747 | 8/1974 | Woolfson | 318/702 |
| 3,909,688 | 9/1975 | Blaschke et al. | 318/702 X |
| 4,008,425 | 2/1977 | Dickey | 318/314 |
| 4,015,180 | 3/1977 | Tetsugu et al. | 318/314 |
| 4,085,355 | 4/1978 | Fradella | 318/721 X |
| 4,099,103 | 7/1978 | Seeger et al. | 318/721 X |

FOREIGN PATENT DOCUMENTS 2305682 8/1974 Fed. Rep. of Germany .

*Primary Examiner*—David Smith, Jr.
*Assistant Examiner*—G. Z. Rubinson
*Attorney, Agent, or Firm*—Robert A. Shack

[57] ABSTRACT

A method and apparatus for controlling the rotational speed and phase of a synchronous motor is provided by sensing the motion of the poles with respect to the stator to provide sensor signals. The sensor signals are converted to sensor pulses and compared to constant pulses. Driving pulses are generated so that if the poles run ahead, a braking moment is generated, and if the poles lag behind, an accelerating moment is generated.

4 Claims, 7 Drawing Figures

METHOD AND APPARATUS FOR CONTROLLING THE ROTATIONAL SPEED AND PHASE OF SYNCHRONOUS MOTORS

BACKGROUND OF THE INVENTION

This invention concerns a method and apparatus for controlling the rotational speed and phase of synchronous motors. The invention includes a rotor with at least one pair of poles, and a stator with at least one field coil that is charged with driving pulses. The invention is specifically applicable with reaction motors of timekeeping devices such as clocks, using a pulse generator, which generates pulses of constant frequency and width.

In the case of synchronous motors, especially in the case of motors in the area of fine mechanics, it is frequently necessary to adhere to the most constant possible rotational speed and/or the most constant possible number of revolutions in a given time interval. With pulse-driven synchronous motors, it is also desirable to keep as constant as possible the phase of the rotor poles, with respect to the pulses with which the field coil is being charged. The reason for this is that too severe a phase shift frequently is the beginning of a permanent deviation of the rotational speed. This happens, for example, when the driving pulses "overtake" the poles of a rotor by integer multiples, a process which is called a pole jump.

Deviations with respect to the rotational speed and phase are based both on internal and external influences. Among these are different loading moments, frictional forces, and inertial forces, which can act on a rotating system with an appropriate moment of inertia. The last-mentioned case is particularly prevalent with transportable clocks and among these, particularly with wristwatches. If the driving system is sensitive to shock, this can lead to permanent status deviations, which can accumulate, in the course of time, to form intolerable indicator errors. Such influences can be counteracted by designing the motor and the control appropriately. However, this entails increased power consumption on the part of the motor. If the motor is driven by batteries, this leads either to a frequent replacement of batteries, or to batteries of very large size. Both contingencies are especially undesirable with watches. Batteries with a large volume are intolerable with wristwatches, especially with ladies' watches.

The prior art includes reactive synchronous motors with at least one field coil, where the field coil is charged with an alternating voltage. This alternating voltage is synchronous with the rotational motion of the magnetic field that is generated by the rotor. Such a motor not only consumes much power, but also has the disadvantage that a pulse that has been lost through a pole jump can no longer be retrieved. Such a system cannot keep constant the number of revolutions in a prescribed time interval.

DE-OS No. 23 05 682 discloses that a watch drive can be charged with two pulse trains, that differ slightly with respect to frequency, but that have the same pulse width. One of these pulse trains has a lesser frequency and the other has a greater frequency than would be theoretically required for absolute running accuracy. The relative switch-on time of the two pulse trains is controlled and differs over a longer time interval, and in this way the driving speed oscillates about an average value. Inasmuch as a drive by a synchronous motor is mentioned, the rotational speed of the motor is supposed to be changed by changing the energy supply. The idea deals with two different, average, but inherently constant energy levels. Such a control system can be compared with a two-point control. The disadvantage of this known system lies in its considerable dead time, since the control does not intervene quickly enough with impact-like counter-torques. In this way, there is a risk that the rotational speed will fall below a limit, which will result in a lag that can no longer be caught up.

The invention is based on the aim of specifying a control procedure and an arrangement which operate without noticeable dead times, which react to an impact-like counter-torque instantly with a corresponding increase of the driving power of the motor, and which nevertheless involve the smallest possible power consumption on a time average.

SUMMARY OF THE INVENTION

Briefly stated and according to an aspect of this invention, this aim is achieved by sensing the motion of the poles with respect to the stator by means of an inductive sensor coil. The sensor signals are converted into corresponding, essentially rectangular sensor pulses. The constant pulses (of a pulse generator) are compared with the sensor pulses regarding their width and phase. Driving pulses are generated synchronously with the sensor pulses, with their width proportional to the phase shift. Their phase, with respect to the poles, is chosen so that, if the pole leads, a braking moment is generated, and, if the pole lags, an accelerating moment is generated. The pulse generator, for example a quartz oscillator, therefore does not deliver the actual driving pulses, but only controls pulses which form the basis of a comparison. Using these control pulses, the sensor pulses are measured as regards their width and phase. It turns out that an increasing pulse width also signals an increasing phase shift. The reason is that the motion of the poles of the rotor, which is proportional to the rotational speed, depending on the number of poles, either lags behind or leads the pulse frequency. The width of a driving pulse is proportional to the extent of phase shift. Since the width of the driving pulses also corresponds to the power consumption of the motor, the motor power is immediately matched to the power demand at the beginning of a phase shift. In this way, unreasonable phase shifts are immediately equalized. Furthermore, the process of sensing the phase shift of the sensor pulse with respect to the generator pulses furthermore determines which sign the phase shift has, or respectively whether the rotor is leading or trailing. The moment of generating the driving pulses is chosen with respect to the respective pole position in such a manner that either a braking or an accelerating action is exerted on the rotor.

The measures specified above achieve a quasi-continuous proportional control, which partically has no dead time. An impact-like countermoment can therefore be equalized in an extremely short time, i.e. within one or two working pulses. The power demand here depends exclusively on the external loads; when the system is idling, the power demand is a minimum.

It may happen that, because of an excessive impact-like torque, one or more pulses on occasion nevertheless do not lead to the desired pole change; that is, they have a pole jump as a consequence. In this case, the control process can cause the motor to develop its maximum power, through which the pole jump is again reprocessed. According to this invention, this happens by additionally counting the constant pulses (of the generator) and the sensor pulses per unit time. If a pole is leading, one forms a driving pulse in the full width of the sensor pulse to generate a braking moment. If a pole is lagging, one forms a driving pulse in the full width of the sensor pulse to generate an accelerating moment.

The invention also concerns an arrangement for implementing the process specified above. This arrangement first of all contains a synchronous motor, in conventional fashion, and in particular a reaction motor, comprising: a rotor with at least one pair of poles, and a stator with at least one field coil; a pulse generator to generate pulses of constant frequency and width; as well as a device for charging the field coil with driving pulses.

Such an arrangement, according to this invention, is characterized as follows: A sensor coil is arranged in the stator, and this coil can be influenced by the rotor. The output of the sensor coil is connected to a comparator, for converting the sensor signals into rectangular sensor pulses. The outputs of the pulse generator and of the comparator are connected to a phase comparator, in which the sensor pulses are compared with the constant pulses of the pulse generator, as regards the position of the pulse edges and as regards the pulse width. If there is a positive phase shift (pole lagging), accelerating driving pulses proportional to this phase shift can be generated in the phase comparator. If there is a negative phase shift (pole advance), braking driving pulses proportional to this phase shift can also be generated therein. These driving pulses are synchronized with the sensor pulses. The output of the phase comparator is connected to the field coil.

BRIEF DESCRIPTION OF THE DRAWINGS

The invention both as to its organization and principles of operation, together with further objects and advantages thereof, may be better understood by referring to the following detailed description of an embodiment of the invention taken in conjunction with the accompanying drawings in which.

DETAILED DESCRIPTION OF THE PREFERRED EMBODIMENT

Figure 1:
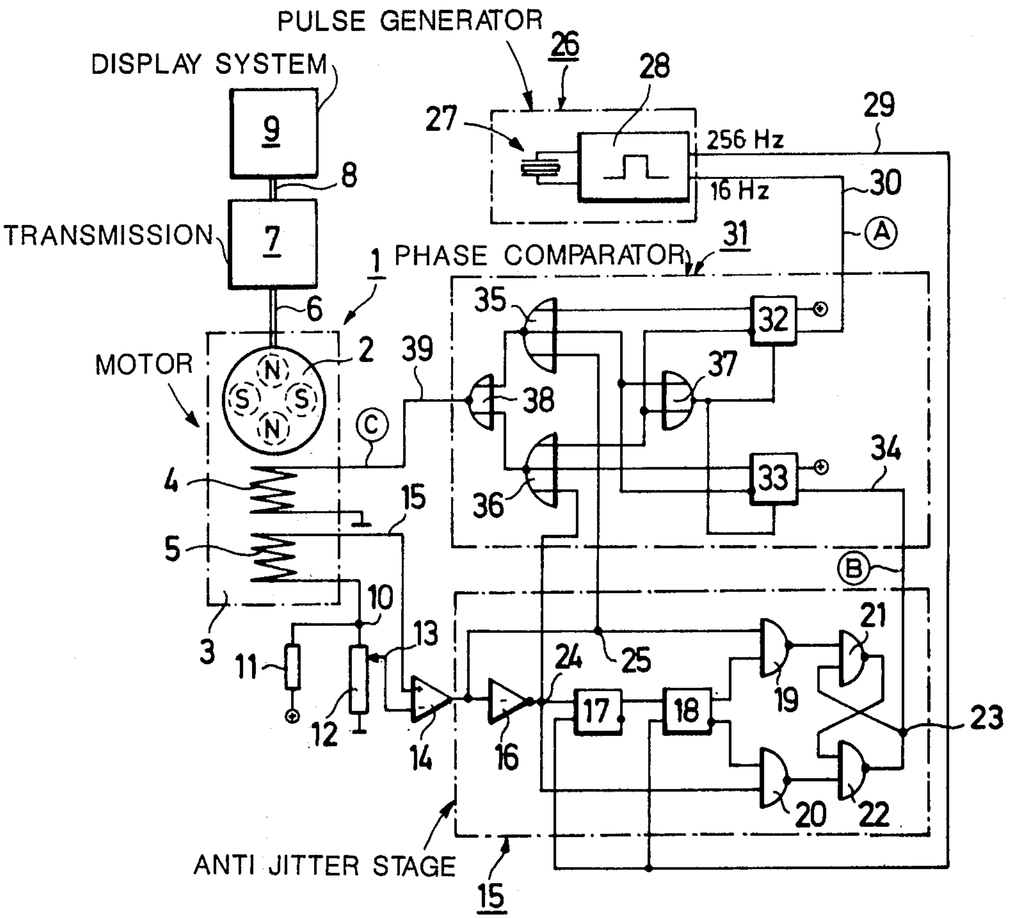
FIG. 1 is a schematic representation of a synchronous motor with control circuitry, in accordance with this invention.

FIG. 1 schematically illustrates a synchronous motor 1, which comprises a rotor 2 and a stator 3, in which a field coil 4 and a sensor coil 5 are housed. The synchronous motor 1 is designed as a reaction motor or as a reactive motor, i.e. the rotor 2 contains poles formed by permanent magnets, which are arranged alternately and which are designated by N and S. By charging the field coil 4 with pulses, for example at a frequency of 16 Hz, the rotor 2 can be brought to a speed that corresponds to the number of pole pairs and to the frequency, in the case shown, therefore, to eight revolutions per second. The rotor 2 is caused to start by auxiliary means which are not shown. As is the case with the principle of the synchronous motor, these means are well known in the art. The revolutions of the rotor 2 are transferred through a shaft 6 to a transmission 7, and from there through a shaft 8, to the display system 9. The display system 9, for example, makes possible an analog display by means of several pointers and a number dial.

The sensor coil 5 is formed by an induction coil. Just like the field coil 4, the induction coil lies within the range of influence of the magnetic lines of the poles N and S of the rotor 2. An output of the sensor coil 5 contacts a connection 10 of a voltage divider, which consists of resistors 11 and 12. In similar fashion, a tap 13 leads from the resistor 12 to a comparator 14, as is the case with a second output 15 of the sensor coil 5.

When the rotor 2 rotates, the magnetic field lines of the poles N and S periodically cut the sensor coil 5. In this way, a sinusoidal voltage with zero crossings, the so-called sensor signal, is generated at the input of the comparator 14. The comparator 14 can also be called a pulse shaper. Here, the sensor signal is converted into rectangular pulses. The vertical edges of these pulses lie at the points of the zero crossings of the sensor signal. The rectangular pulses now replace the positive curve traces of the sensor signal. The pulse intervals between the pulses now replace the negative curve traces of the sensor pulses.

The output of the comparator 14 is connected to an anti-jitter stage 15. The purpose of stage 15 is to suppress brief noise pulses, which result from stray effects from the field coil 4 and the sensor coil 5. The anti-jitter stage 15 contains an inverter 16 and two D-Flip-Flops 17 and 18 of Type MC 14013 (all the type designations here are catalog merchandise of Motorola Company, USA). The output of inverter 16 is connected to terminal 24 and to a first input of D-Flip-Flop 17 as well as a second input of a NAND gate 20. The output of D-Flip-Flop 17 is connected to a first input of D-Flip-Flop 18. The outputs of D-Flip-Flop 18 are connected to first inputs of NAND gates 19 and 20. Furthermore, the anti-jitter stage 15 has two NAND gates 19 and 20 of Type MC 14011, and two NAND gates 21 and 22 of the same type. Because of their circuitry, they form another Flip-Flop. The outputs of NAND gates 19 and 20 are respectively connected to first inputs of NAND gates 21 and 22. The outputs of NAND gates 21 and 22 are connected to a common terminal 23. The second input of NAND gate 21 is connected to terminal 23 at the output of NAND gate 22 and the second input of NAND gate 22 is connected to the output of NAND gate 21. A second input of NAND gate 19 is connected to terminal 25 and to the output of comparator 14.

A pulse generator 26 is also associated with the entire arrangement. This comprises a quartz oscillator 27 and a frequency divider 28 with two outputs. Rectangular pulses with frequencies of, for example, 16 Hz and 256 Hz are present at these outputs. The output with the 256 Hz frequency is connected through a line 29 to second inputs of the D-Flip-Flops 17 and 18.

The output of the frequency divider 28, at which the 16 Hz frequency is present, is connected through a line 30 to a phase comparator 31. Specifically, line 30 is connected to a D-Flip-Flop 32 of Type MC 14013. Another D-Flip-Flop 33 of the same type is connected through a line 34 with the terminal 23 of the anti-jitter stage 15. The phase comparator 31 also comprises two other NOR gates 35 and 36 of Type MC 14025 as well as two further NOR gates 37 and 38 of Type MC 14001 interconnected as shown. An input of the NOR gate 35 is connected with the terminal 25, and an input of the NOR gate 36 is connected with the terminal 24 of the anti-jitter stage 15. The output of the NOR gate 38 is connected through a line 39 with the field coil 4, whose other side is grounded.

The mode of operation of the arrangement according to FIG. 1 is explained in more detail in connection with FIGS. 2–7. The letters A, B, and C at the right margin of FIGS. 2–7 refer to the correspondingly labelled points of the line layout in FIG. 1, i.e. at the respective points, pulses will exist, under the operating conditions explained below, which correspond to the pulses shown in FIGS. 2–7.

Figure 2:
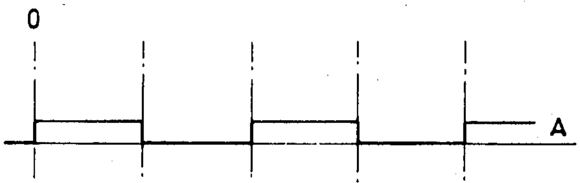
FIG. 2 is a pulse train from a pulse generator, in accordance with this invention.

FIG. 2 illustrates the generator pulses with the frequency 16 Hz. This frequency is applied to one input of the D-Flip-Flop 32 of the phase comparator 31. The respective pulse train A is compared with that pulse train, which is induced in the sensor coil 5 because of the rotation of the rotor 2. After appropriate signal processing, it is present at terminal 23 (location B) of the anti-jitter stage 15. The two pulse trains are compared with one another. In particular, the output frequency of the pulse generator 26 is the (constant) theoretical frequency, and the pulse frequency at location B is the so-called actual frequency. Both frequencies are phase shifted with respect to one another in the normal case. Depending on the phase shift between the two frequencies, or respectively depending on the difference between the number of generator pulses (A) and sensor pulses (B) over a prescribed time interval, a sequence of driving pulses is formed on the line 39 (C). Their different appearance, in dependence on operating conditions, is explained in more detail by means of FIGS. 3 through 7 (always the lower diagram). The driving pulses are here formed synchronously with sensor pulses; however, they lie only within the edges of the latter, and do not necessarily extend over the entire width of the sensor pulses. The width of the driving pulses here depends both on the phase shift and on the difference between the theoretical frequency and the actual frequency. The position of the driving pulses at the beginning and/or at the end of the sensor pulses depends on the sign of the phase shift and respectively on leading or lagging conditions. Depending on the relative position of the driving pulse with respect to the sensor pulse, a braking or accelerating torque is generated. The magnitude of this torque again is proportional to the phase shift and the frequency difference. By "driving pulses" are also understood such pulses which effect a negative drive, i.e. a braking action.

Figure 3:
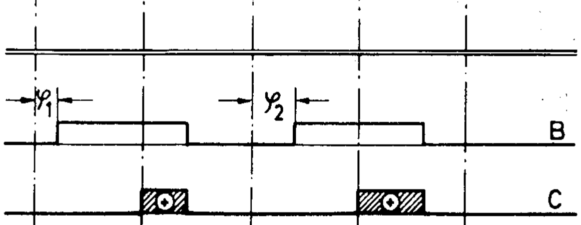
FIGS. 3 through 7 are pulse trains showing in the upper diagram the sensor pulses, and in the lower diagram the driving pulses, which result by comparing the generator pulses according to FIG. 2, for different phase and speed deviations or respectively pole jumps, in accordance with this invention.

In FIG. 3, the sensor pulses (B) are phase shifted and are wider as compared to the generator pulses (A). This indicates that the rotational speed has fallen. The rotor trails more and more, and the positive phase shift increases from $\phi_1$ to $\phi_2$. Because of the comparison in the phase comparator 31, this will generate a sequence of driving pulses with increasing width, where this width is proportional to the phase shift. These driving pulses occur at the end of each sensor pulse. The sensor pulse of course also indicates the position of the respective pole, which generates the sensor pulse, where this position is measured with respect to the field coil 4. This happens because of the spatial position of the field coil 4 and of the sensor coil 5 with respect to one another, as shown in FIG. 1. These coils are arranged in a common plane, which runs radially to the rotor 2. This can be effected particularly suitable in such a fashion that the axes of the field coil 4 and the sensor coil 5 are aligned coaxially with respect to one another, and also coincide with a radius of the rotor 2. By the position of the driving pulses with respect to the sensor pulses, and consequently with respect to the poles, an accelerating driving pulse is generated. This is symbolically indicated by a "+". The effect of these pulses is to make the phase shift as small as possible, i.e. to bring it to a value which is conditioned on the stationary driving losses which occur up to the display system 9.

Figure 4:
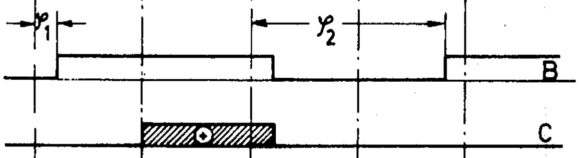

FIG. 4 also shows a sequence of sensor pulses (B), which trail the generator pulses (A), i.e. the phase shift is positive and progressive. This is a sign that the actual frequency deviates much more strongly from the theoretical frequency, a process that can occur through an especially strong impact-like torque. As a result of comparing the sensor pulses (B) with the generator pulses (A) in the phase comparator 31, driving pulses (C) are formed, which are correspondingly wider, as is indicated by the cross-hatched pulse in FIG. 4. The respective driving pulse generates a very much stronger accelerating torque, so as again to reduce the phase shift $\phi_2$. Here too, the accelerating action of the driving pulses is conditioned by the relative position with respect to the sensor pulse or respectively with respect to the pole.

Figure 5:
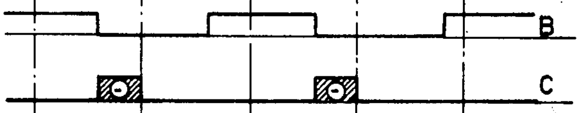

FIG. 5 shows a sequence of sensor pulses (B) which leads with respect to the generator pulses (A), i.e. the phase shift is negative. Through the comparison described above, a sequence of driving pulses (C) is now generated in the phase comparator 31. Their position with respect to the sensor pulses or respectively poles is such that a braking torque is generated. This is indicated by a "−". These braking or negative driving pulses essentially restore the agreement of the generator and sensor pulses.

FIGS. 3, 4, and 5 show circumstances in which no pole jump "$\epsilon$" has as yet taken place. A pole jump is defined as a rotational deviation: gap between pole pairs, always specified in angular degrees. In other words: counting the generator and sensor pulses leads to agreement of the pulse numbers.

Figure 6:
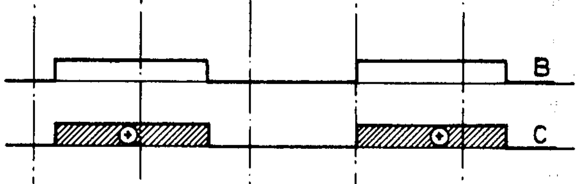
Figure 7:
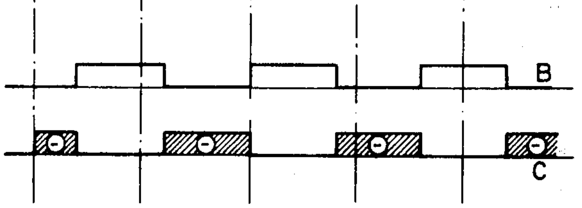

The situation is otherwise in the case explained by means of FIGS. 6 and 7. Here, the phase comparator ascertained that, e.g. because of an extremely strong external shock-like torque, a pole advance or a pole lag has been initiated, which is larger than an integer multiple of the pole gap. This means that either the generator pulses have "overtaken" the sensor pulses and therefore the poles (pole trailing), or inversely (pole leading). This condition could not be eliminated by a simple proportional control, as has been explained by means of FIGS. 3, 4, and 5. The reason for this is that such a simple control cannot sense a pole jump. However, an embodiment of the subject of the invention eliminates this circumstance. According to this embodiment, the phase comparator 31 is designed in such a fashion that, if the pole advance is greater than an integer multiple of the pole gap (pole jump $\epsilon=-1, -2, -3, \ldots$), braking driving pulses can be generated in the full width of the sensor pulses and synchronous with the latter. If the pole trailing exceeds an integer multiple of the pole gap (pole jump $\epsilon=1, 2, 3 \ldots$), accelerating driving pulses are generated in the full width of the sensor pulses and synchronous with the latter.

The respective processes are shown in FIGS. 6 and 7.

With the operating condition, whose effects are shown in FIG. 6, a pole jump exists in the form of a pole trailing by an integer multiple, i.e. the sequence of generator pulses has overtaken the sequence of sensor pulses. In this case, a driving pulse (C) is generated in the full width of the sensor pulse and synchronous with the latter. Because of its high torque, this again eliminates the trailing condition of the pole, i.e. the rotor 2 is briefly accelerated so strongly that the pole jump is reduced to zero.

With the operating condition according to FIG. 7, there exists a pole jump in the form of a pole advance, i.e. the sequence of sensor pulses has overtaken the sequence of generator pulses. In the phase comparator 31, the comparison described above now generates driving moments with a strong braking action, which again eliminate this pole jump.

It should here be endeavored to prevent the pole jump from becoming larger than 1, especially if the trailing of the pole is to be eliminated. In the case of a pole advance, however, the objective is to reduce the electrical driving power, and this objective may make it suitable to allow larger pole jumps and to balance these out successively, since a braking of the rotor 2 occurs in any event through frictional forces.

The arrangement in accord with FIG. 1 can be built up for battery voltages above 3 volts with conventional CMOS circuits (Complementary Metal Oxide Semiconductor Circuits). The connection of the battery with the arrangement according to FIG. 1 has not been shown in particular, but has only been represented by "⊕".

With the arrangement shown, only simple pole jumps ($\epsilon=\pm 1$) can be sensed. Inasmuch as multiple pole jumps ($\epsilon=\pm 2, 3, \ldots$) are to be balanced out, the Flip-Flops 32 and 33 must be replaced by ascending and descending counters or by right-left shift registers.

While an embodiment and application of the invention have been shown and described, it will be apparent to those skilled in the art that many more modifications are possible without departing from the inventive concepts herein described. The invention, therefore, is not to be restricted except as is necessary by the prior art and by the spirit of the appended claims.

What is claimed as new and desired to be secured by Letters Patent of the United States is:

1. Apparatus for controlling the rotational speed and phase of a synchronous motor having a rotor with at least one pair of poles and a stator with at least one field coil, to which acceleration driving or braking driving pulses are applied, comprising:

a sensor coil, having an output, coupled with the stator capable of being influenced by the rotor and for providing sensor signals of a frequency proportional to the rpm of the rotor;

comparator means, having an output, connected to said output of said sensor coil for converting said sensor signals into rectangular sensor pulses;

a pulse generator, having an output, for generating control pulses of constant frequency and width; and a phase comparator means, having an output, and including means for generating driving pulses at said output, connected to the field coil, said driving pulses being synchronized with said sensor pulses, said phase comparator means being connected to said output of said comparator means and said output of said pulse generator, for comparing said sensor pulses with said control pulses as to phase and pulse width, wherein if a positive phase shift (poles lagging) results, accelerating driving pulses are generated of a time duration in proportion to that phase shift, if a negative phase shift (poles leading) results, braking driving pulses are generated of a time duration in proportion to that phase shift.

2. Apparatus as in claim 1 wherein said phase comparator means generates braking driving pulses to said field coil of said stator synchronous with said sensor pulses when the poles are leading more than an integer multiple of the pole gap (pole jump $\epsilon=-1, -2, -3,$—) if the poles are lagging more than an integer multiple of the pole gap (pole jump $\epsilon=1, 2, 3,$—), accelerating driving pulses are generated to said field coil of said stator synchronous with said sensor pulses.

3. Apparatus as in claim 2 including an inverter and wherein said phase comparator means includes two D-Flip-Flops and four NOR gates said first D-Flip-Flop having driving pulses applied on an input side, said second D-Flip-Flop having said rectangular sensor pulses applied to an input side after being inverted by said inverter, the outputs of said first and second Flip-Flops being connected, on the one hand, with the inputs of said first and second NOR gates and, on the other hand, with the inputs of said third NOR gate, whereby the output of said third NOR gate is connected with the reset inputs of said first and second D-Flip-Flops, a further input of said first NOR gate is connected with the output of said comparator means, and another input of said second NOR gate is connected with the output of said inverter, the outputs of said first and second NOR gate are connected with two inputs of said fourth NOR gate, whose output is connected with a coil end of said field coil.

4. Apparatus as in claim 3 further including an anti-jitter stage being connected between said output of said comparator means and said input of said second D-Flip-Flop of said phase comparator means for separating noise pulses generated in the sensor coil by inductive coupling of said sensor coil to the field coil.

* * * * *